US010417184B1

(12) United States Patent
Long (10) Patent No.: US 10,417,184 B1
(45) Date of Patent: Sep. 17, 2019

(54) WIDELY ACCESSIBLE COMPOSITE COMPUTER FILE OPERATIVE IN A PLURALITY OF FORMS BY RENAMING THE FILENAME EXTENSION

(71) Applicant: Keith George Long, Gulf Breeze, FL (US)

(72) Inventor: Keith George Long, Gulf Breeze, FL (US)

( * ) Notice: Subject to any disclaimer, the term of this patent is extended or adjusted under 35 U.S.C. 154(b) by 221 days.

(21) Appl. No.: 15/611,829

(22) Filed: Jun. 2, 2017

(51) Int. Cl.
*G06F 17/30* (2006.01)
*G06F 16/16* (2019.01)
*G06F 16/182* (2019.01)
*G06F 16/178* (2019.01)
*G06F 17/00* (2019.01)

(52) U.S. Cl.
CPC ........ *G06F 16/166* (2019.01); *G06F 16/1794* (2019.01); *G06F 16/182* (2019.01)

(58) Field of Classification Search
None
See application file for complete search history.

(56) References Cited

U.S. PATENT DOCUMENTS

| | | | | |
|---|---|---|---|---|
| 5,991,798 A * | 11/1999 | Ozaki | ................... | G11B 27/105 709/217 |
| 6,507,858 B1 * | 1/2003 | Kanerva | .................. | G06F 16/93 715/234 |
| 6,549,918 B1 * | 4/2003 | Probert, Jr. | ........... | G06F 16/258 |
| 6,565,609 B1 * | 5/2003 | Sorge | .................... | G06F 16/972 715/234 |
| 6,613,098 B1 * | 9/2003 | Sorge | .................. | G06F 17/2264 715/234 |
| 6,915,012 B2 | 7/2005 | Osborne et al. | | |
| 7,451,392 B1 * | 11/2008 | Chalecki | ............. | G06F 17/2247 715/234 |
| 7,477,793 B1 * | 1/2009 | Boliek | ................... | H04N 19/70 382/240 |
| 7,487,448 B2 * | 2/2009 | Emerson | ............... | G06F 17/218 715/255 |
| 7,747,558 B2 | 6/2010 | Martinez Smith et al. | | |
| 8,160,295 B2 | 4/2012 | Sakai et al. | | |

(Continued)

FOREIGN PATENT DOCUMENTS

WO WO 2009023213 2/2009

OTHER PUBLICATIONS

Kunrong Chen, Václav Rajlich "Case Study of Feature Location Using Dependence Graph", 2000 IEEE (Year: 2000).*

(Continued)

*Primary Examiner* — Polina G Peach
(74) *Attorney, Agent, or Firm* — Hanrahan Law Firm, P.A.; Benjamin M. Hanrahan (57) ABSTRACT

A computer data file that is operational or accessible in two or more different forms by two or more different common, ubiquitous and/or native programs or applications is presented herein. More specifically, the computer data file can be accessed in a first form when the computer data file has a first filename extension, and the computer file can be accessed in a second form when the computer data file has a second and different filename extension. At least one of the filename extensions is a browser-based filename extension (.HTM, .HTML) such that the composite file is accessed via a web browser in one of the modes.

6 Claims, 8 Drawing Sheets

(56) References Cited

U.S. PATENT DOCUMENTS

| | | | |
|---|---|---|---|
| 8,271,544 B2 | 9/2012 | Chan et al. | |
| 8,306,368 B2 | 11/2012 | Beato et al. | |
| 8,340,440 B2 | 12/2012 | Lee et al. | |
| 8,631,346 B2 | 1/2014 | Petrovicky et al. | |
| 8,918,712 B2* | 12/2014 | Nario | G06F 9/445 |
| | | | 715/239 |
| 9,009,123 B2 | 4/2015 | Agush | |
| 9,535,881 B1 | 1/2017 | Root | |
| 2002/0194227 A1* | 12/2002 | Day | G06F 17/2247 |
| | | | 715/234 |
| 2004/0049734 A1 | 3/2004 | Simske | |
| 2004/0267813 A1* | 12/2004 | Rivers-Moore | G06F 17/2247 |
| 2005/0165826 A1* | 7/2005 | Ho | G06F 16/972 |
| 2005/0203944 A1* | 9/2005 | Dinh | G06F 9/466 |
| 2005/0232498 A1 | 10/2005 | Osborne et al. | |
| 2006/0239564 A1 | 10/2006 | Cha et al. | |
| 2006/0242178 A1 | 10/2006 | Butterfield et al. | |
| 2006/0277452 A1* | 12/2006 | Villaron | G06F 17/2229 |
| | | | 715/207 |
| 2006/0288329 A1* | 12/2006 | Gandhi | G06F 21/51 |
| | | | 717/114 |
| 2007/0100846 A1 | 5/2007 | King et al. | |
| 2007/0100865 A1 | 5/2007 | King et al. | |
| 2007/0103566 A1 | 5/2007 | Aerrabotu et al. | |
| 2008/0243892 A1 | 10/2008 | Little et al. | |
| 2008/0250047 A1* | 10/2008 | Hannuksela | G11B 27/3027 |
| 2009/0046940 A1 | 2/2009 | Beato et al. | |
| 2010/0281070 A1 | 11/2010 | Chan et al. | |
| 2011/0029546 A1* | 2/2011 | Mineno | G06F 16/258 |
| | | | 707/756 |
| 2012/0011340 A1* | 1/2012 | Flynn | G06F 12/0246 |
| | | | 711/171 |
| 2013/0132833 A1* | 5/2013 | White | G06F 3/048 |
| | | | 715/704 |
| 2014/0108897 A1* | 4/2014 | Boutelle | G06F 17/214 |
| | | | 715/201 |
| 2014/0156663 A1* | 6/2014 | Rhyu | G11B 27/031 |
| | | | 707/737 |
| 2014/0241647 A1 | 8/2014 | Wee et al. | |
| 2015/0095645 A1* | 4/2015 | Eldar | G06F 21/6209 |
| | | | 713/168 |
| 2018/0091867 A1* | 3/2018 | Moore | H04N 21/25858 |

OTHER PUBLICATIONS wikipedia.org | "JPEG File Interchange Format, from Wikipedia, the free encyclopedia," webpage as provided by Archive Wayback Machine at <https://web.archive.org/web/20151105032731/https://en.wikipedia.org/wiki/JPEG_File_Interchange_Format>, published on or before Nov. 5, 2015, obtained on Feb. 19, 2018.

* cited by examiner

WIDELY ACCESSIBLE COMPOSITE COMPUTER FILE OPERATIVE IN A PLURALITY OF FORMS BY RENAMING THE FILENAME EXTENSION

FIELD OF THE INVENTION

The present invention is generally directed to a computer data file that is operational or accessible in two or more different forms by two or more different common, ubiquitous and/or native programs or applications, for example, by simply renaming the filename extension. More specifically, certain aspects of the computer data file can be accessed when the computer data file has or is assigned a first filename extension (including, but in no way limited to .JPG, .PNG, .MP3, etc.) and further aspects of the computer file can be accessed when the computer data file has or is assigned a second and different filename extension (including, but in no way limited to .HTM, .HTML, etc.)

BACKGROUND OF THE INVENTION

It is known that files can be combined or appended/prepended together. The problem, however, is that in order to access or extract the data that is appended/prepended to another file, special proprietary software must be utilized in order to parse, extract and view the data.

For example, appending HTML or browser-based content to an image or other like file can create several problems. Particularly, there is generally no way to access the HTML content without special software that is configured to read the appended data. Also, the appended data will be lost if the underlying image file or other file is edited, even if utilizing an editor that supports and retains metadata. Without more, simply renaming the file from a .JPG extension to an .HTM or .HTML extension will not work because web browsers interpret and display HTML files according to HTML and CSS specifications; the binary data of the JPG or like-file would display as nonsensical data or gibberish in the browser. Also, depending on the type of file, it is possible the entire file may not load in the first place.

Accordingly, there is a need in the art for a composite computer file and a method of creating a composite computer file that can be accessed in two different manners by two different programs or applications that are both common, ubiquitous and not specialized. For example, it would be beneficial if a user could create or obtain a composite file that can be opened and accessed in both a native or common application (such as an image viewer) and a native or common web browser, simply by renaming the filename extension.

SUMMARY OF THE INVENTION

In particular, the present invention is directed to a composite computer data file and a method of creating a composite computer data file. The file can be accessed or viewed in at least two different modes by renaming the filename extension of the file. By doing so, the composite file is not converted in any manner, and the contents of the file remain the same regardless of what filename extension is assigned. Rather, the different filename extension will allow different widely accessible programs to show/hide certain data, as described herein, in a manner such that the file can be opened or accessed in two different forms, each form displaying different information, data, or content.

For instance, CSS, JavaScript, HTML or other web-based or browser-based content can be embedded into and/or be appended/prepended to a container file in order to create the composite file. In at least one embodiment, the browser-based content can be embedded into writable sections, such as the metadata sections of an image or audio file serving as the container file. Doing so will allow native image viewers (for image files) and other like programs (such as audio programs for audio files, etc.) to ignore the embedded browser-based content.

Additionally, as will be described herein, certain portions of the browser-based content is specifically configured and strategically placed in order to hide the binary data of the container file, when the composite file is renamed as an HTM or HTML file and opened in a web browser. Thus, in one form, the composite file will have a filename extension that is the same as the container file (e.g., .JPG, .GIF, .PNG, .TIFF, .MP3, .WAV, .PDF, etc.) In such a form, the composite file can be opened using a native or common program designed to open files with the designated filename extension, and the embedded and/or appended/prepended browser-based content will be ignored.

In a second form, the composite file will have a filename extension that is browser-based or HTML-based, such as .HTM or .HTML. Thus, when the renamed composite file is loaded into a web browser, the web browser will read or interpret the browser-based content that was embedded or added. Certain strategically configured and placed portions of the browser-based content will cause the web browser to ignore, hide or mask the binary data of the container file from being displayed as gibberish by the web browser.

In this manner, virtually any web-based or browser-based content (including full-fledged applications) can be embedded into and/or be appended/prepended to a binary file to create the composite file. Accordingly, browser-based content can include virtually any content, data, programs, applications, or language, etc. that can be interpreted by, accessed by, or read by a web browser, and thus, the browser-based content of certain embodiments of the present invention can include, but is not limited to, HTML content, CSS content, JavaScript content, PHP content, etc.

For example, certain embodiments of the present invention can be implemented to embed an image gallery into a JPG file. Particularly, a developer can create browser-based content that represents a self-contained image gallery application accessible or viewable via a web browser. The gallery may consist of a single, self-contained HTML file comprising CSS, HTML, JavaScript, and some Base64-encoded images. The gallery, which is fully functional in a standard web browser, may be embedded into a JPG image. To open or view the image file, a user can simply click on it and a common or native image viewer will open the JPG file. To view the embedded gallery, a user will simply rename the .JPG extension to .HTM or .HTML, and then click on the file. The image gallery will then be loaded into a native or standard web browser with full functionality. Renaming the filename extension back to .JPG returns the file to the original viewable image.

As another example, a note application can be developed into a self-contained HTML file containing HTML, CSS, JavaScript, etc. that allows a user to view notes pertaining to either the container image or to data, content, images, attachments, etc. within the HTML file. As above, the note application can be embedded into a JPG or other binary file, which can be renamed between .JPG (or other container filename extension) and .HTM or .HTML to switch modes.

These and other objects, features and advantages of the present invention will become more apparent when the drawings as well as the detailed description are taken into consideration.

BRIEF DESCRIPTION OF THE DRAWINGS

Like reference numerals refer to like parts throughout the several views of the drawings provided herein.

DETAILED DESCRIPTION OF THE INVENTION

Figure 1:
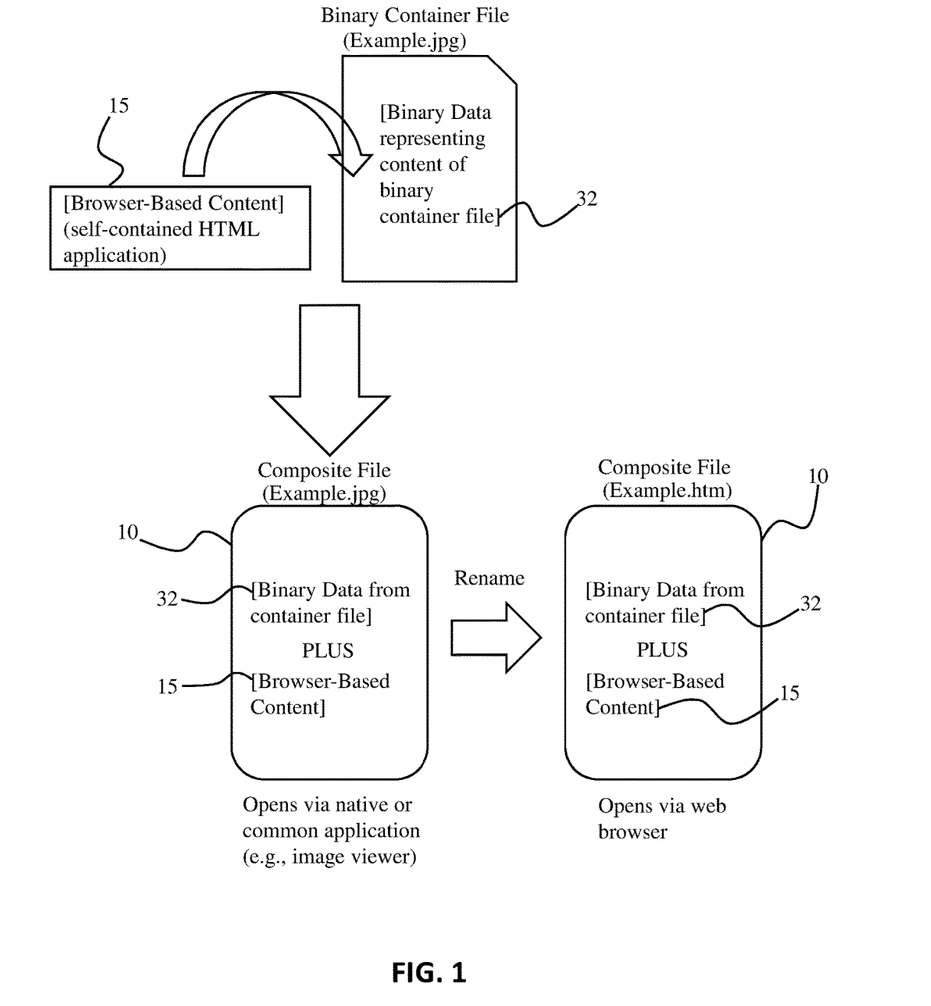
FIG. 1 is a schematic flow diagram illustrating the contents and method of creating the composite data computer file as disclosed in accordance with at least one embodiment of the present invention.

As shown in the accompanying drawings, and with particular reference to FIG. 1, the present invention is directed a composite computer file, generally shown as 10, which can be accessed or is otherwise operational in two or more different forms depending on the assigned or given filename extension. As will become apparent from the description herein, certain embodiments are specifically configured such that the composite computer file 10 can be accessed in either form via common, ubiquitous or native programs or applications. In this manner, the composite computer file 10 of certain embodiments may be considered widely accessible in that special, proprietary or specifically configured programs or applications may not be required to access or operate the composite computer file 10 in either one or more of the forms, and in some cases, both or all of the forms.

In at least one embodiment, the present invention allows for the embedding of browser-based applications or other browser-based content 15 into a computer file, referred to herein as a container file 30. For instance, the container file 30 may be virtually any file that allows additional or ancillary data or information to be embedded therein or added thereto while the container file 30 remains functional, operational or accessible. For example, in some cases, the container file 30 may include a binary or text-based file that allows for the addition of ancillary data, such as metadata embedded within the file and/or that allows data to be prepended to the beginning of the file and/or appended to the end of the file.

In particular, the container file 30 may be an image file, (such as, but not limited to a file having any one of the following filename extensions: JPG, .JPEG, .PNG, .TIFF, etc.), a music or audio file (such as, but not limited to a file having any one of the following filename extensions: .MP3, .MP4, .AIFF, .WAV, etc.) or other file that allows for the addition of custom writable or ancillary data (e.g., metadata) and/or appended/prepended data.

In this manner, as will be provided herein, the composite computer file 10 of the present invention may, at least initially, include or be assigned a filename extension that matches that of the container file 30. For example, if the container file 30 is a JPG file, then the composite computer file 10 of at least one embodiment can, at least initially, have a first filename extension of .JPG. This allows the composite computer file 10, in a first form (e.g., when the composite file 10 has a first filename extension) to be accessible by any program or application that is configured to access files associated with the first filename extension.

Accordingly, if the container file 30 is an image file, for example, then the container file 30 and the subsequently created composite computer file 10 may be readily accessible via an image viewer or other common application or program that is configured or capable of accessing images or files having the corresponding filename extension (e.g., an image viewer that is capable of opening or accessing JPG files). Of course, and as another example, if the container file 30 is a music or audio file, then the container file 30 and the subsequently created composite computer file 10 may be readily accessible via a common music or audio application or program that is configured or capable of opening or accessing music or audio files having a corresponding filename extension.

Once the container file 30 is selected, created or otherwise determined, the composite computer file 10 can be created by adding browser-based content 15 to the container file 30 in a manner such that the browser-based content 15 can be accessed, interpreted or read by a common, ubiquitous or native application, such as a web browser (not shown), while the binary, textual or other content/data 32 (e.g. container-file data) of the container file 30 is hidden, masked or otherwise not displayed in the web browser. For instance, browser-based content 15, as used herein, can include virtually any code, content, data, programs, applications, or language, etc. that can be interpreted by, accessed by, or read by a web browser, and thus, the browser-based content 15 of certain embodiments of the present invention can include, but is not limited to, HTML code/content, CSS code/content, JavaScript code/content, PHP code/content, base-64 encoded content, etc.

As provided herein, the container file data 32 may include opening or header data (e.g., in the form of a start of image (SOI) marker, proprietary or vendor metadata (including metadata field markers), etc., as well as the binary or other data that represents the image, music, audio, or other content of the file). Furthermore, the browser-based content 15 can include the main browser-based content 20 (i.e., the actual user application/content), and in some embodiments, at least a portion of the browser-based content 15 may also include a masking module 22, discussed in more detail below, and/or one or more strategically placed comment tags 24, 25, 26, 27 that are configured to hide and/or 'comment out' the binary or text content data 32 of the container file 30 when the composite computer file 10 is assigned a second filename extension (e.g., .HTM or .HTML) and is loaded into a web browser. Of note, other kinds of HTML tags can also be utilized to hide the binary or text content data 32 of the container file 30, such as HTML <div> tags containing a class attribute (corresponding to applicable CSS styling) that hides the data (for example: <div class="HideData">The Data to Hide</div>) and/or an inline style attribute (for example: <div style="display: none;">The Data to Hide</div>). However, for the sake of brevity, the use of comment tags 24, 25, 26, 27 is sufficient.

In particular, the comment tags 24, 25, 26, 27 or other tags/code can be used to strategically show/hide portions of the composite file 10 such that the binary or other data 32 from the container file 30 is hidden, while the browser-based content 15 is read, viewable or interpreted by the web browser. It should be noted, however, that the browser-based content 15 (i.e., comprising the masking module 22, the main browser content 20, and the comment tags 24, 25, 26, 27) cannot be placed freely, as-is, just anywhere within the binary, text or other data 32 of the container file 30. Doing so would likely corrupt the container file 30 rendering it non-viewable and/or inaccessible. Rather, the masking module 22, the main browser-based content 20, and/or the comment tags 24, 25, 26, 27 may be placed into writable portions of the container file 30, such as, for example, metadata fields, and/or non-metadata portions by being prepended and/or appended to the file. For exemplary purposes only, in a JPG image file, the masking module 22, the main browser-based content 20, and at least some of the comment tags 24, 25, 26, 27 may be written in either the APPn (0xFF, 0xEn) segments and/or COM (comment) (0xFF, 0xFE) segments. In doing so, the masking module 22, the main browser-based content 20, and the comment tags 24, 25, 26, 27 will be ignored by an image viewing program or other native or common program configured to open or access the same file type. Similarly, the binary content 32 or content/data from the container file 30 can be made hidden or ignored by virtue of the masking module 22 and comment tags 24, 25, 26, 27 when the composite file 10 is opened, viewed or accessed by a web browser. Also, the main browser-based content 20 can be made viewable in or readable/accessible by a web browser.

Specifically, when the composite computer file 10 is assigned or otherwise includes a first filename extension, the composite computer file 10 can be opened or viewed by a native, common or ubiquitous program configured to open or access that type of file, such as an image viewer, a music or audio application, a PDF viewer, etc. In this mode, the image viewer or other program or application will ignore the masking module 22, the main browser based-content 20, and the comment tags 24, 25, 26, 27. However, if the composite file 10 is renamed to include a different filename extension, such as a browser-based filename extension (e.g., .HTM or .HTML), then, when the composite file 10 is opened or accessed by a web browser, the main browser-based content 20 is viewable, accessible or readable by the web browser while the binary or other content of the container file 30 is ignored or hidden due to the masking module 22 and/or the comment tags 24, 25, 26, 27.

In order to illustrate some embodiments of the present invention, some examples are provided below. These examples should not be deemed limiting, but rather are for illustrative purposes only.

Figure 2:
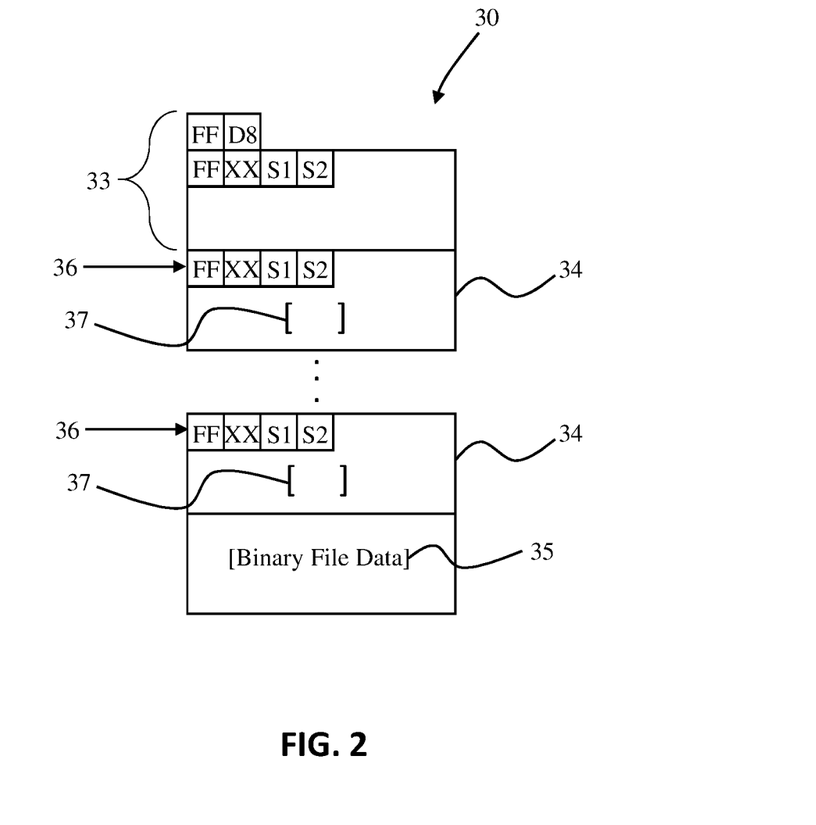
FIG. 2 is a block diagram of the layout of an exemplary binary file for illustrative purposes.

Example 1: Embedding Browser-Based Content into a Single Metadata Field of a Binary Container File FIG. 2 represents a general block diagram of an exemplary binary-based container file 30 that allows for one or more metadata fields 34. In particular, the container file 30 may include some header or introductory data, represented as 33, often at the top or beginning of the file 30. The header or introductory information 33 often (but not necessarily) includes one or more starting markers and/or one or more introductory parameters. In the case of a sample JPG image file, the header 33 begins with a Start of Image (SOI) marker, designated as [FF] [D8] in FIG. 2, followed by an APP0 marker segment that specifies image parameters. Other information may be contained in the header 33 of the container file 30, including but not limited to, instances of vendor or proprietary metadata. Of course, depending on the type of binary file, for instance, whether the file is JPG, PNG, MP3, WAV, PDF, etc. the exact file structure may vary, although many, but not necessarily all, will include similar header or introductory information or data represented as 33. Next, still referring to FIG. 2, the file layout may include one or more metadata fields, generally represented as 34. Oftentimes, the metadata fields 34 begin with marker bytes, represented as 36, followed by the content of the metadata field, represented as 37. The marker bytes 36 represented in the exemplary FIG. 2 show four (4) bytes illustrated as [FF][XX][S1][S2]. In the case of a JPG file, the first two bytes indicate the type of marker, and the next two bytes indicate the size or length of the field 37 (the size/length calculated to include the preceding two "sizing" bytes). Specifically, the byte illustrated as [FF] is the first marker byte in a metadata field 34, and [XX] represents the second marker byte indicating the type of marker or field. The [S1] [S2] bytes of the marker bytes 36 are taken together to represent a big-endian 16-bit integer specifying the size or length of the metadata field 34. Again, it should be noted that this is representative of JPG files, and other binary or text files can be used in accordance with this invention such that the marker bytes and fields may be represented differently. Still referring to FIG. 2, following the metadata fields 34, is the binary content/data 35 of the file, representing the image, audio, or other content of the container file 30.

Figure 3A:
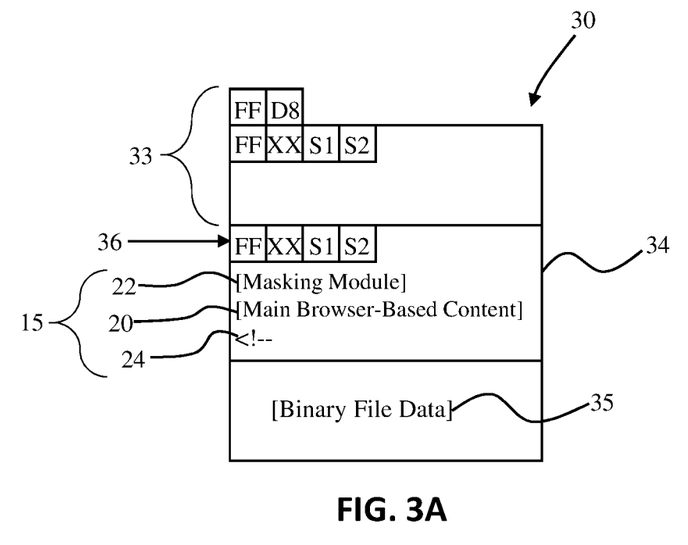
FIG. 3A is a block diagram illustrating browser-based content embedded into a single instance of a metadata field of a binary file (Example 1).

FIG. 3A represents a block diagram showing how the masking module 22, the main browser-based content 20, and an opening HTML comment tag 24 can be embedded or placed into the container file 30 to create the composite file 10 of at least one exemplary embodiment of the present invention. For instance, in this example, the browser-based content 15, consisting of the masking module 22, the main browser-based content 20, and an opening HTML comment tag 24 is embedded within a single metadata field 34 of the container file 30.

In this example, because the main browser-based content 20 is embedded near the beginning of the file (not at the very beginning of the file), there are a few extraneous characters above the main browser-based content 20, such as the SOI and image parameters, etc. (represented as the header 33), as well as the first four bytes of the custom metadata field, represented as 36. The masking module 22 of at least one embodiment is configured to cover and/or hide these characters positioned above the main browser-based content 20 from being displayed in a web browser. As an example, the masking module 22 may include code, such as CSS, <div> tags, and/or JavaScript code, configured or adapted to hide the initial characters of the loaded file. An exemplary masking module 22 can be implanted with or otherwise include the following CSS code and <div> tag(s):

<style>
.Mask {
left: 0px;
top: 0px;
width: 100%;
height: 100%;
position: fixed;

```
background-color: white;
overflow: hidden;
}
</style>
<div class="Mask" id="Mask">
```

It should also be noted that in some embodiments, JavaScript or other like code can be used either alone or in combination with the above code to hide the extraneous characters of the header 33 and the opening marker bytes 36. For example, after the above code is used to hide the initial characters of the loaded file, the following JavaScript code can later be employed to reload the main content, minus the extraneous characters at the beginning of the file:

```
<script type="text/javascript">
var theContent=document.getElementById("Example1")
    .innerHTML;
var win=window.open(" ", 'self');
win.focus( );
win.document.body.outerHTML=theContent;
var theContent=" ";
</script>
```

Of course, other masking modules 22 can be used or implemented in order to mask, hide or cover the initial characters, such as the header 33 and opening marker bytes 36, within the full spirit and scope of the various embodiments of the present invention.

Next, the main browser-based content 20 can be added into the one or more metadata fields 34 of the file. The main browser-based content 20 can be virtually any code, module, etc. that can be interpreted by a web browser, and thus, in many cases, can include HTML code or other content and applications that can be interpreted by a web browser. This can include, for example, an image gallery, a slideshow, a note application, an MP3 player, etc.

For exemplary and simplicity purposes, the main browser-based content 20 of at least one implementation can include the following rather basic code (with an opening HTML comment tag 24 at the end), although other more complex, lengthy code can certainly be implemented:

```
<style>
html, body {
height: 100%;
overflow: hidden;
}
.Example1 {
height: 100%;
overflow: auto;
z-index: 5000;
}
</style>
<div class="Example1" id="Example1">
<html>
<head>
<meta http-equiv="X-UA-Compatible" content="IE=edge,
    chrome=1">
<meta name="viewport" content="width=device-width, ini-
    tial-scale=1.0">
<meta charset="utf-8">
<meta name="Description" lang="en" content="Example
    1">
<meta name="author" content="Keith George Long">
</head>
<body>
<center>
<h1>Hello World!</h1>
<p style="margin-left:3em; margin-right:3em;">This is a
    basic example of embedding static
HTML content into a JPG image.
</p>
<br>
<img src="Example.htm">
</center>
</body>
</html>
</div>
</div>
<!- -
```

Following the above opening HTML comment tag 24 in the last line of the above segment will be the binary container file data 35 representing the binary content of the image.

As an initial note, the image represented by "Example.htm" in the above example is not a separate external image, nor is it a Base64-encoded image. Rather, the image source is actually the image file in which the browser-based content 15 is embedded. For instance, with reference to FIG. 1, again, the initial container file 30 may be representative of an image file titled "Example.jpg." When the browser-based content 15 (which consists of the masking module 22, the main browser-based content 20, and the opening HTML comment tag 24) is added to the container file to create the composite file 30, the composite file 30 may still have the same filename, e.g., "Example.jpg." Thus, when loaded into an image viewer, the image viewer will ignore the masking module 22, the main browser-based content 20, and the opening HTML comment tag 24 that were added, since they were added to a metadata field, and the original image will be loaded. However, if the filename extension is renamed from .JPG to either .HTM or .HTML, then the composite file 10 can be loaded into a web browser. Upon doing so, due to the masking module 22, the web browser will hide the header information 33 as well as the opening marker bytes 36 of the metadata field in which the masking module 22, the main browser-based content 20, and the opening HTML comment tag 24 are inserted. The web browser will also ignore the binary image data 35 of the original image due to the opening HTML comment tag 24 strategically positioned at the end of the main browser-based content 20. Also, there is no need to include a closing HTML comment tag 25, as the remaining portions of the file include the binary data of the image and will all be 'commented out.' In this manner, by referring to "Example.htm" as an image source, the web browser will be able to display the original image that was represented in the original container file "Example.jpg."

It should again be noted that whereas the above example is representative of embedding the masking module 22, the main browser-based content 20, and the opening HTML comment tag 24 into a COM or APPn segment of a JPG file, other files can be used as the container file.

For example, a PNG file can be used as the container file such that the header portion 33 may include introductory characters and/or one or more IHDR chunks or portions. Accordingly, the masking module 22, the main browser-based content 20, and the opening HTML comment tag 24 can be embedded or inserted into a tEXT (metadata) portion of the file. In such a case, the masking module 22 may be configured to hide or mask the header 33, as well as the preliminary characters of the tEXT chunk within which the masking module 22, the main browser-based content 20, and the opening HTML comment tag 24 are embedded.

Furthermore, as another example, an MP3 file can be used as the container file such that the header portion 33 may include certain introductory characters, as well as one or more ID3 frame. Accordingly, the masking module 22, the main browser-based content 20, and the opening HTML comment tag 24 can be embedded or inserted into an ID3 frame portion of the file. In such a case, the masking module 22 may be configured to hide or mask the header 33, as well as the preliminary characters of the ID3 frame within which the masking module 22, the main browser-based content 20, and the opening HTML comment tag 24 are embedded.

Example 2: Appending Browser-Based Content to a Binary Container File

This example demonstrates how browser-based content can be appended to the end of a binary file. For instance, referring to FIG. 3B a block diagram showing how the main browser-based content 20 can be appended to the end of the container file 30 to create the composite file 10 of at least one exemplary embodiment of the present invention. For instance, similar to Example 1, a masking module 22 may be embedded into a metadata field 34 of the container file. As before, this masking module 22 can be used to hide or cover the header portion 33 as well as the marker bytes 36 of the metadata field 34 within which the masking module 22 is placed. The masking module 22 may be similar to that of Example 1 and is not reproduced here.

Figure 3B:
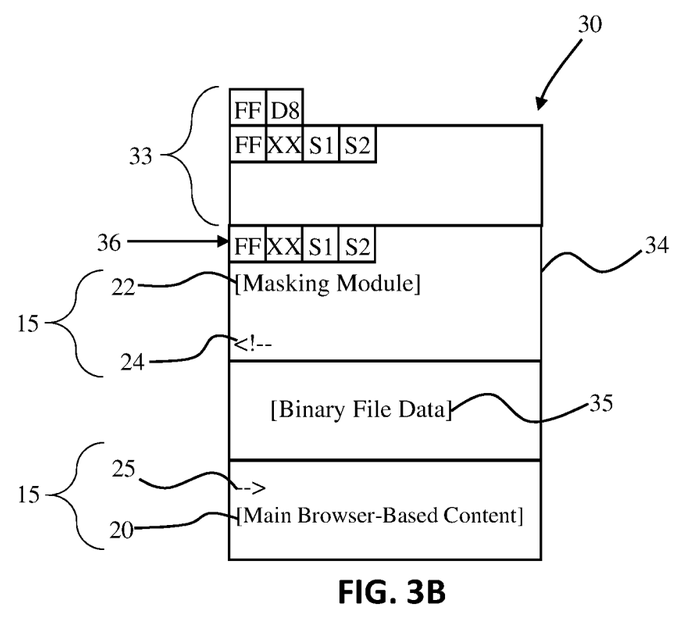
FIG. 3B is a block diagram illustrating at least a portion of browser-based content appended to the end of a binary file (Example 2).

However, as shown in the block diagram of FIG. 3B, following the masking module 22 is an opening HTML comment tag 24 ("<!- -"). This opening HTML comment tag 24 is used to 'comment out' the image or other binary data that follows, as shown in FIG. 3B.

However, because the main browser-based content 20 is appended to the end of the file, following the image or binary data 35, the main browser-based content 20 in this example is preceded by an ending HTML comment tag 25 ("- ->"). In this manner, when the composite file 10 is reassigned an .HTM or .HTML filename extension and loaded into a web browser, the web browser will ignore the commented binary data and read the main browser-based content 20 appended to the file following the closing HTML comment tag 25.

Furthermore, it should be noted that appending at least some of the main browser-based content 20 to the end of the binary file 30 can be advantageous in at least one aspect in that the main browser-based content 20 can be virtually any size, whereas oftentimes, metadata fields 34 are limited in size. For example, in a JPG file type, each metadata field is limited to approximately 64 KB each (although multiple metadata fields can be added). In a PNG file type, a maximum of 2,147,483,647 bytes can be placed into metadata fields—this is the overall total of bytes allowed for metadata fields in a PNG file type, whether the data is placed into a single metadata field or broken into multiple metadata fields.

However, even though appending the main browser-based content 20 to the end of the binary container file 30 may allow for main browser-based content 20 of virtually any size, it still has some drawbacks. For example, if the data corresponding to the container file (e.g., the image in a JPG or PNG file) is modified while the main browser-based content 20 (or any content for that matter) is appended, then oftentimes, the appended data will be lost, broken or corrupted. For this, and possibly other reasons, if possible, a user may choose to embed the main browser-based content 20 into one or more metadata fields 34 over appending the main browser-based content 20 to the end of the container file 30.

Example 3: Embedding Multiple Chunks of Browser-Based Content into Multiple Metadata Fields of a Binary Container File FIGS. 4A and 4B collectively illustrate one embodiment in which the browser-based content 15 is broken into multiple segments and embedded into multiple different metadata fields 34. Again, this can be done so long as the total size of the overall browser-based content 15 (i.e., which includes the masking module 22, the main browser-based content 20, and any comment tags 24, 25, 26, 27) does not cause the file to exceed the maximum allotted size for all of the combined metadata fields. In the example shown, the container file 30 is a single JPG file, whereas the main browser-based content 20 adds an additional image and an MP3 file in the form of Base64-encoded data, broken into multiple chunks and embedded into different or multiple metadata fields. Although this example uses the JPG format for demonstration purposes, the embedding of multiple chunks of data also works with other file types, too, including, for example, PNG and MP3 files, etc. The only difference is that the multiple chunks of data must be inserted according to the metadata conventions of the specific file types. The goal is to be able to include universally accessible browser-based content/applications as part of existing binary files. In this example, an image file (Base64-encoded) and an MP3 file (Base64-encoded) are embedded into a container JPG file.

Figure 4A:
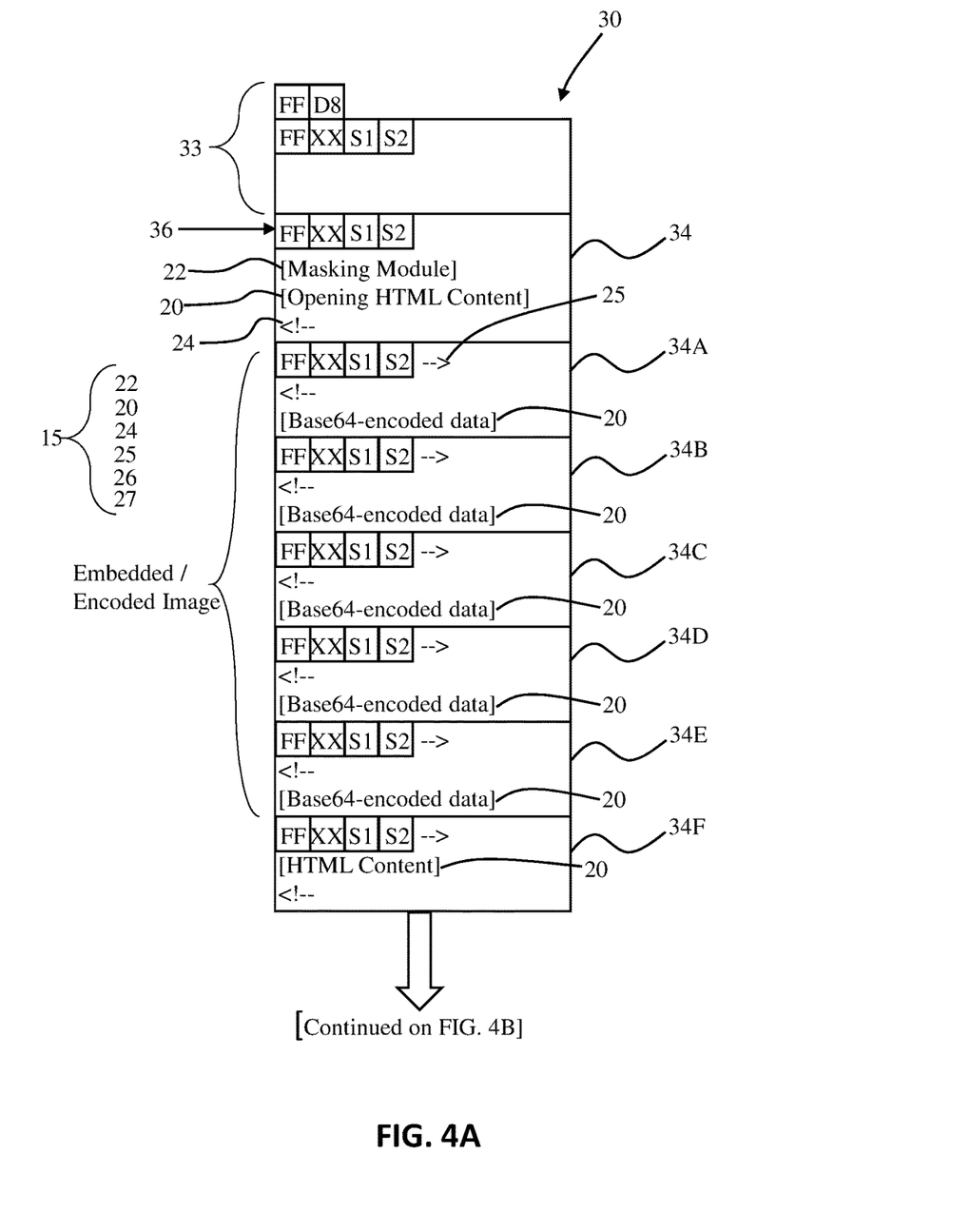
FIGS. 4A and 4B collectively show a block diagram illustrating browser-based content broken into a plurality of chunks and each embedded into different metadata fields of a binary file (Example 3).

Turning to FIG. 4A, similar to Examples 1 and 2, above, a masking module 22 is inserted into a metadata field 34 in order to hide or cover the introductory characters, including, the header content 33 and the opening marker bytes 36 corresponding to the metadata field 34 in which the masking module 22 is instated. The masking module 22 is similar to that provided in the examples above, and is thus not reproduced here.

In this example, some introductory HTML content (that is part of the main browser-based content 20) is also included in the same metadata field 34 as the masking module 22, although the introductory HTML content (as part of the main browser-based content 20) can be inserted into a different metadata field (or fields) not included.

In any event, in this example, the introductory HTML content (as part of the main browser-based content 20) includes the following:

```
<style>
.Example 3 {
width: 100%;
height: 100%;
overflow: auto;
z-index: 5000;
}
</style>
<div class="Example 3" id="Example 3">
<html>
<head>
<meta http-equiv="X-UA-Compatible" content="IE=edge, chrome=1">
<meta name="viewport" content="width=device-width, initial-scale=1.0">
<meta charset="utf-8">
<meta name="Description" lang="en" content="Example 3">
<meta name="author" content="Keith George Long">
</head>
<body>
<center>
```

```
<h1>Hello World!</h1>
<img src="Example.htm" width="300">
</center>
<br>
<br>
<p style="margin-left: 2em; margin-right: 2em;"><b>The
   above image is actually the container image! (The image
   is neither embedded nor is it a separate file.) Because the
   above image is the container image, you can right click on
   the image and save the file to your computer using either
   an .HTM extension or a .JPG extension.</b></p>
<br>
<p style="margin-left: 2em; margin-right: 2em;">The fol-
   lowing image, which is embedded, consists of Base64-
   encoded data and is 210,136 bytes in size; the MP3 audio
   is also embedded as Base64-encoded data and is 156,040
   bytes in size. Because both of these files are above the
   approximate maximum size of 64 KB for a COM marker
   segment in a JPG image, the Base64-encoded data for
   each file was broken into 50 KB (or less) chunks with
   each chunk being stored in a separate COM marker
   segment as hidden text. When the page is loaded,
   Javascript is used to reassemble the chunks and then the
   data is Base64-decoded and loaded as the image and
   audio source. <br><br> Using this method, binary data
   (such as images, MP3 files, etc.) of virtually any size can
   be embedded into JPG files as Base64-encoded data and
   can be accessed without the need for special software.</
   p><br>
<center>
<a class="EmbeddedContent" id="Base64Image">
<!- -
```

As before, the metadata field 34 within which the above is embedded, will end with an opening HTML comment tag 24.

Furthermore, as mentioned above, the main browser-based content 20 in this example includes an image that is 210,136 bytes in size, which is larger than the allotted single instance metadata field in a JPG file type. Accordingly, the image is converted to Base64-encoded data and broken into multiple chunks so that it can be embedded into multiple metadata fields 34A, 34B, 34C, 34D, and 34E, as shown in FIG. 4A. Below is a representation of these metadata fields 34A-34E, although for simplicity and spatial concerns, the actual Base64-encoded data is not shown below and is instead replaced with "[- - - -]." Similarly, each of the metadata fields 34A-34E will begin with the marker bytes 36, which have been replaced as "@ @ @ @" in the example below.

```
@ @ @ @- -><!- - [Base64- segment] [- - - -]
@ @ @ @- -><!- - [Base64- segment] [- - - -]
@ @ @ @- -><!- - [Base64- segment] [- - - -]
@ @ @ @- -><!- - [Base64- segment] [- - - -]
@ @ @ @- -><!- - [Base64- segment] [- - - -]
```

Next, in this example, some additional HTML content that is part of the main browser-based content 20 is embedded into a separate metadata field 34F. As above, the marker bytes 36 are represented below as "@ @ @ @," and are followed by an ending HTML comment tag 25 (e.g., "- ->"), which, when matched with the preceding opening HTML comment tag 24 from the preceding metadata field 34E, will be sure to 'comment out' the opening marker bytes 36 while maintaining that the following HTML content that is part of the main browser-based content 20 is visible or interpreted by the web browser. Also, the HTML content in this metadata field 34F ends with another opening HTML comment tag 24.

```
@ @ @ @- ->
<img id="Embedded1" width="300" src=" " alt=" ">
</a>
<br><br>
<a class="EmbeddedContent">
<!- -
```

Figure 4B:
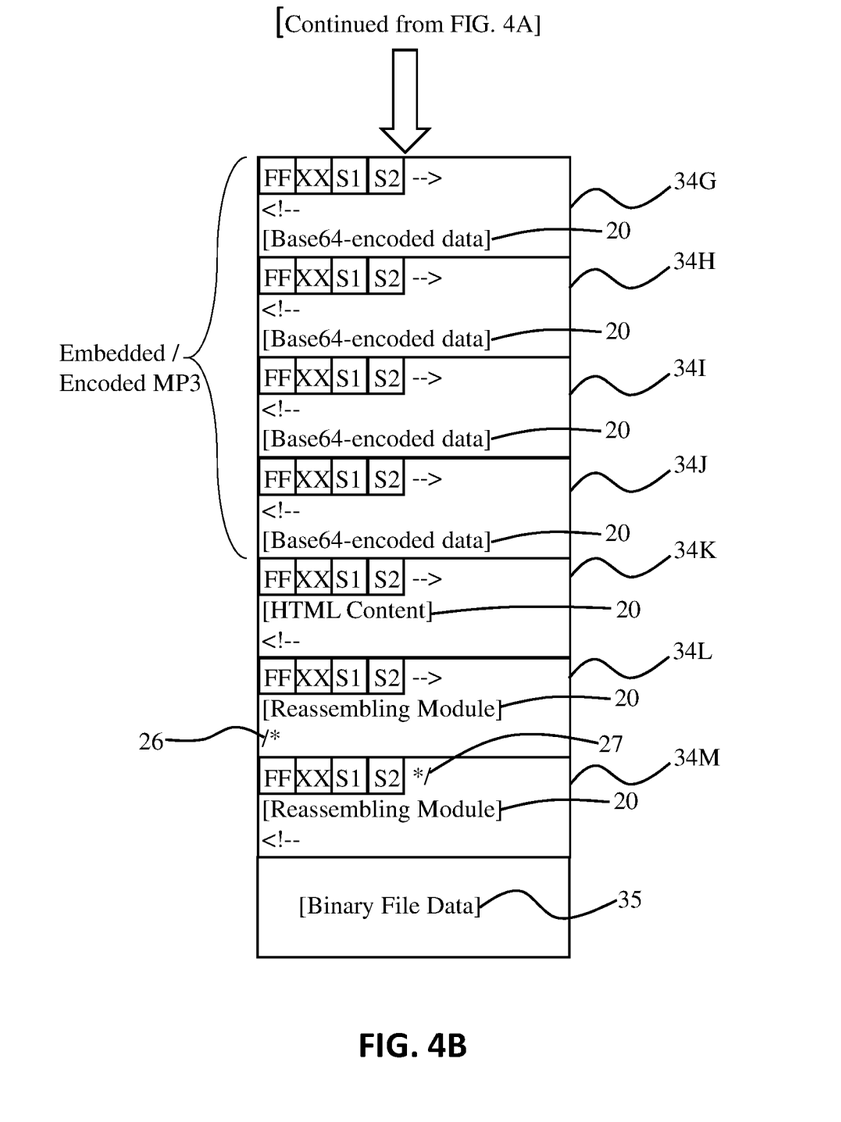

Next, additional main browser-based content 20, in this case, an MP3 file, is converted to Base64-encoded data and broken into multiple chunks (e.g., four (4) in this case) so that it can be embedded into multiple metadata fields 34G, 34H, 34I, and 34J, as shown in FIG. 4B. Below is a representation of these metadata fields 34G-34J, although for simplicity and spatial concerns, the actual Base64-encoded data is not shown below and is instead replaced with "[- - - -]." Similarly, each of the metadata fields 34G-34J will begin with the marker bytes 36, which have been replaced as "@ @ @ @" in the example below.

```
@ @ @ @- -><!- -[Base64- segment] [- - - -]
@ @ @ @- -><!- -[Base64- segment] [- - - -]
@ @ @ @- -><!- -[Base64- segment] [- - - -]
@ @ @ @- -><!- -[Base64- segment] [- - - -]
```

In this example, some further HTML content that is part of the main browser-based content 20 is embedded into another metadata field 34K. Again, the marker bytes 36 are represented below as "@ @ @ @," and are followed by an ending HTML comment tag 25 (e.g., "- ->"), which, when matched with the preceding opening HTML comment tag 24 from the preceding metadata field 34J, will be sure to 'comment out' the opening marker bytes 36 while maintaining that the following HTML content that is part of the main browser-based content 20 is visible or interpreted by the web browser. Also, the HTML content in this metadata field 34K ends with another opening HTML comment tag 24.

```
@ @ @ @- -><!- -[Base64-segment]- ->
<audio      id="Embedded2"       controls="controls"
   autobuffer="autobuffer" autoplay="autoplay">
<source src=" ">
</audio>
</a>
<br><br>
<br><br>
</center>
</body>
<!- -
```

Furthermore, in this example, the main browser-based content 20 can include additional code or a reassembling module which is configured to reassemble the content (e.g., the Base64-encoded content) that was broken up and embedded into multiple metadata fields. For instance, referring to this example, an image was broken into five (5) separate metadata fields 34A through 34E and an MP3 was broken up and embedded into multiple metadata fields 34G through 34J. The following reassembling module portion of the main browser-based content 20 is configured to reassemble those chunks so that the content can be used and is accessible by the web browser. In this example, via the following non-limiting code, the reassembly module is written in JavaScript, although other codes, languages or modules that can reassemble the broken-up portions can be implemented. In addition, whereas the following code or reassembly module is small enough to reside in a single metadata field, it has been broken up into two chunks and embedded into two separate contiguous fields (e.g., COM marker segments), for exemplary purposes and to show that JavaScript comment tags 26, 27 can also be used to 'comment out' data as needed. With reference to FIG. 4B, the first segment below is embedded in metadata field 34L and the second segment below is embedded in metadata field 34M.

```
@ @ @ @- ->
<script>
var imgs=document.getElementsB yClassName("Embed-
    dedContent");
if (imgs !=null) {
for (var i=0; i<imgs.length; i++)
while (i<imgs.length) {
tContent=imgs.item(i).innerHTML;
var tBlock=" ";
mySplitResult=tContent.split("- -><!- -[Base64- segment]
    "); for(z=0; z<mySplitResult.length;
z++)
{
/*
@@@@*/tSegment
=mySplitResult[z];
if (tSegment.indexOf("<!- -") !==-1 II tSegment.indexOf("-
    ->") !==-1) {
} else {
tSegment=tSegment.slice(0, -4); tBlock=(tBlock+tSeg-
    ment);
}
}
var currentNumb=(i+1);
var currentFile="Embedded"+currentNumb;
if (tContent.includes("IMGContent")) {
document.getElementById(currentFile).setAttribute('src',
    'data:image/JPG;base64,'+tBlock);
} else {
document.getElementById(currentFile).setAttribute('src',
    'data:audio/MP3;base64,'+tBlock);
}
i=(i+1);
}
}
}
</script>
</html>
</div>
</div>
<!- -
```

As before, the metadata field immediately before the binary data of the container file 30 (e.g., the JPG image of the container file in this example) ends with an opening HTML comment tag 24. This will make sure that the binary content 35 corresponding to the image or content of the container file 30 is not shown in the web browser when the composite file 10 is renamed as a browser-based file (e.g., with a filename extension of .HTM or .HTML), and loaded into a web browser.

Figure 5:
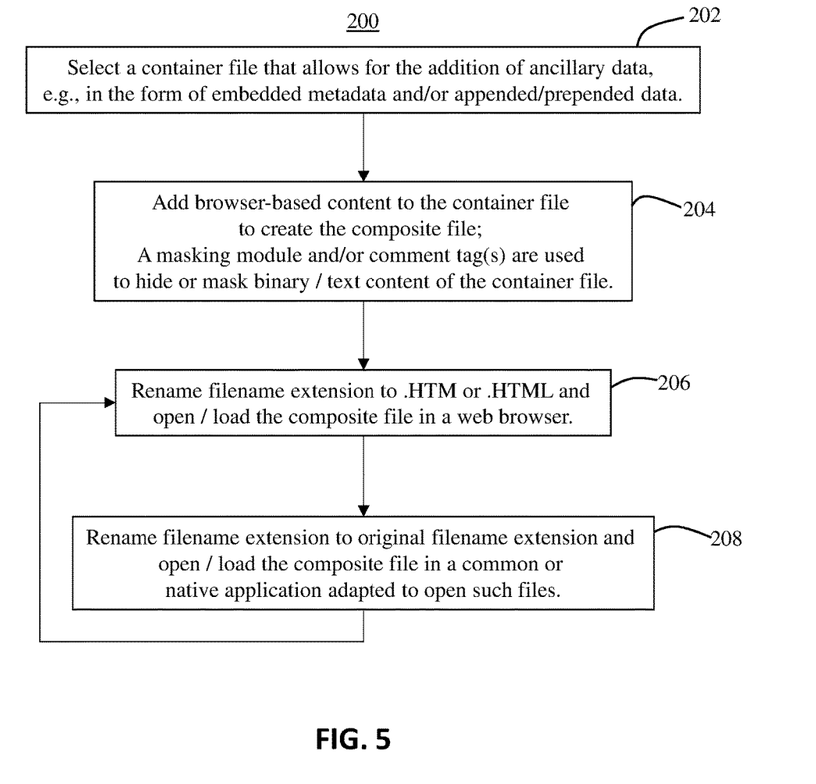
FIG. 5 is a high-level flow chart illustrating the method of creating a composite computer data file in accordance with at least one embodiment of the present invention.

With reference now to FIG. 5, at least one embodiment of the present invention further includes a method 200 of creating a composite computer file 10 as disclosed herein. Specifically, the method 200 includes selecting, creating or determining a container file 202, which as described herein, can be virtually any binary-based, text-based, or other computer file that allows for the addition of ancillary data, whether in the form of metadata added accordingly to corresponding metadata fields and/or added to non-metadata portions such as by being appended to the end of the file and/or added or prepended to the beginning of the file. Accordingly, as provided herein, the container file 30 of at least one embodiment can include a filename extension such as JPG, PNG, GIF, TIFF, MP3, MP4, AIFF, WAV, etc.

In a broad sense, and as shown at 204 in FIG. 5, the method 200 includes adding browser-based content 15 to the container file to create a composite file containing data representing the underlying container file and browser-based content. The main browser-based content 20 can be virtually any program, application, code, module, etc. that can be run, executed, accessed or viewed by a conventional web browser. Furthermore, a masking module 22 and/or one or more strategically placed comment tags 24, 25, 26, 27 (as provided above, and as represented in Examples 1, 2 and 3 herein) are used to mask, hide, or comment out the binary or text data of the underlying container file, when the composite file is opened or accessed by a web browser.

For instance, once the browser-based content 15 is added to a qualifying container file, whether in the form of embedded metadata and/or as data that is appended/prepended to the container file in order to create the composite file, the composite file will initially have the same filename extension as the container file. Since the masking module 22, the main browser-based content 20, and the comment tags 24, 25, 26, 27 are either embedded entirely within one or more metadata fields (e.g., COM or APPn field(s) of a JPG file, tEXT field(s) of a PNG file, ID3 field(s) of an MP3 file, etc.) and/or appended/prepended to the container file content of a qualifying container file type, the composite file can be opened using any native, common or ubiquitous computer program that is adapted to open or access files having the corresponding filename extension. The added masking module 22, the main browser-based content 20, and the comment tags 24, 25, 26, 27 will not impact the viewing or accessing of the file.

However, as shown at 206 in FIG. 5, in at least one embodiment, the filename extension of the composite can simply be renamed or reassigned to a browser-based or Hypertext Markup Language (HTML) filename extension (such as .HTM or .HTML). Upon doing so, and then loading the renamed composite file 10 into a web browser (i.e., virtually any web browser on virtually any platform), the web browser will interpret the browser-based content 15 that was added and will ignore or not show the binary or text content from the container file due to the masking module 22 and/or the strategically placed comment tags 24, 25, 26, 27.

In addition, as shown at 208, the composite file can again be renamed or reassigned to include the same filename extension as the underlying container file. Upon doing so, and then loading the composite file back into a program or application that is adapted to open or access files having the corresponding filename extension (e.g., an image viewer in the case of a JPG or PNG file), the browser-based content 15 will again be ignored or otherwise will not impact the viewing of the file, which will show the underlying container file only.

The renaming back and forth between the web browser-based filename extension (e.g., .HTM or .HTML) and the original filename extension from the underlying container file will allow the user to go back and forth between viewing/accessing the browser-based content and the underlying container file as desired.

Figure 6A:
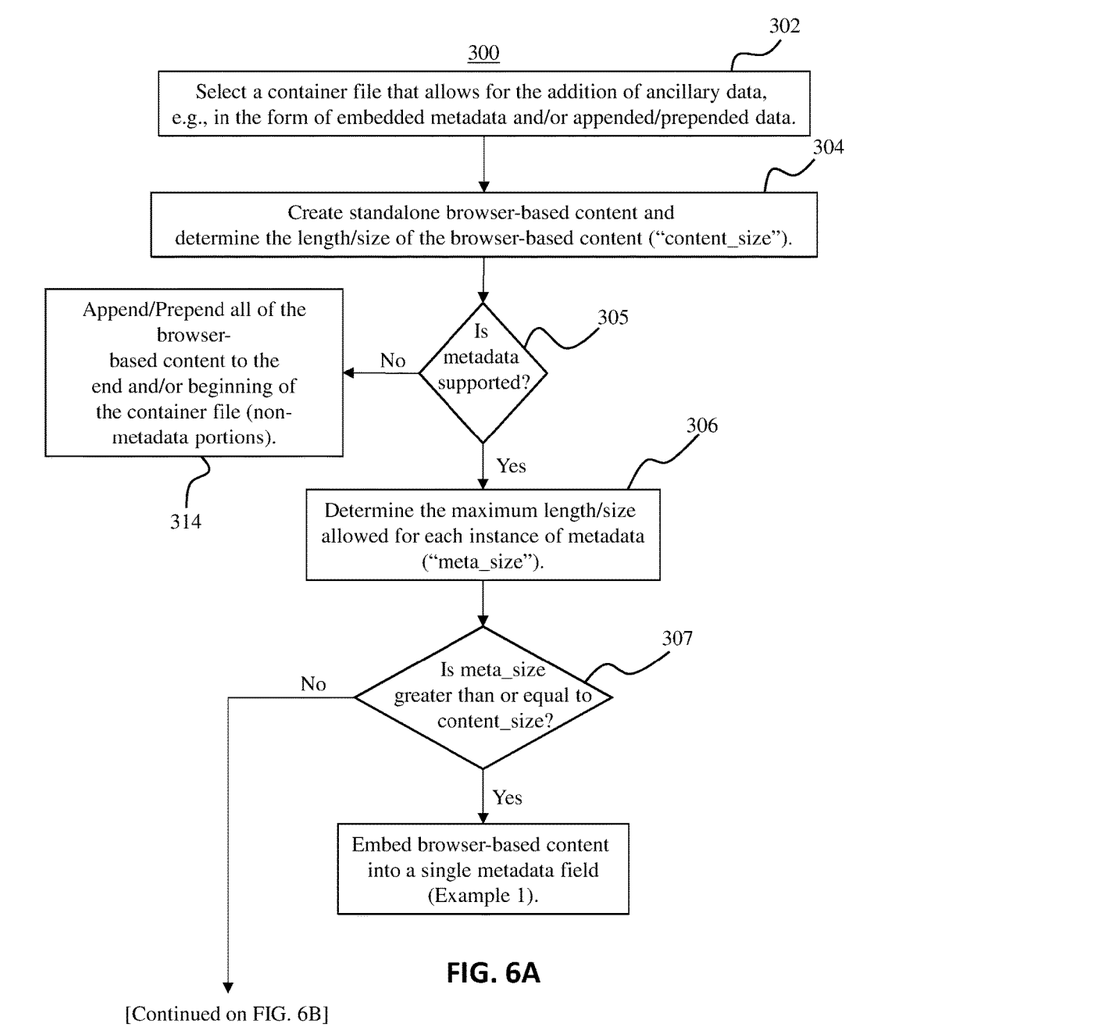
FIGS. 6A and 6B collectively show a high-level flow chart illustrating at least another embodiment of the method of creating a composite computer data file as disclosed herein.
Figure 6B:
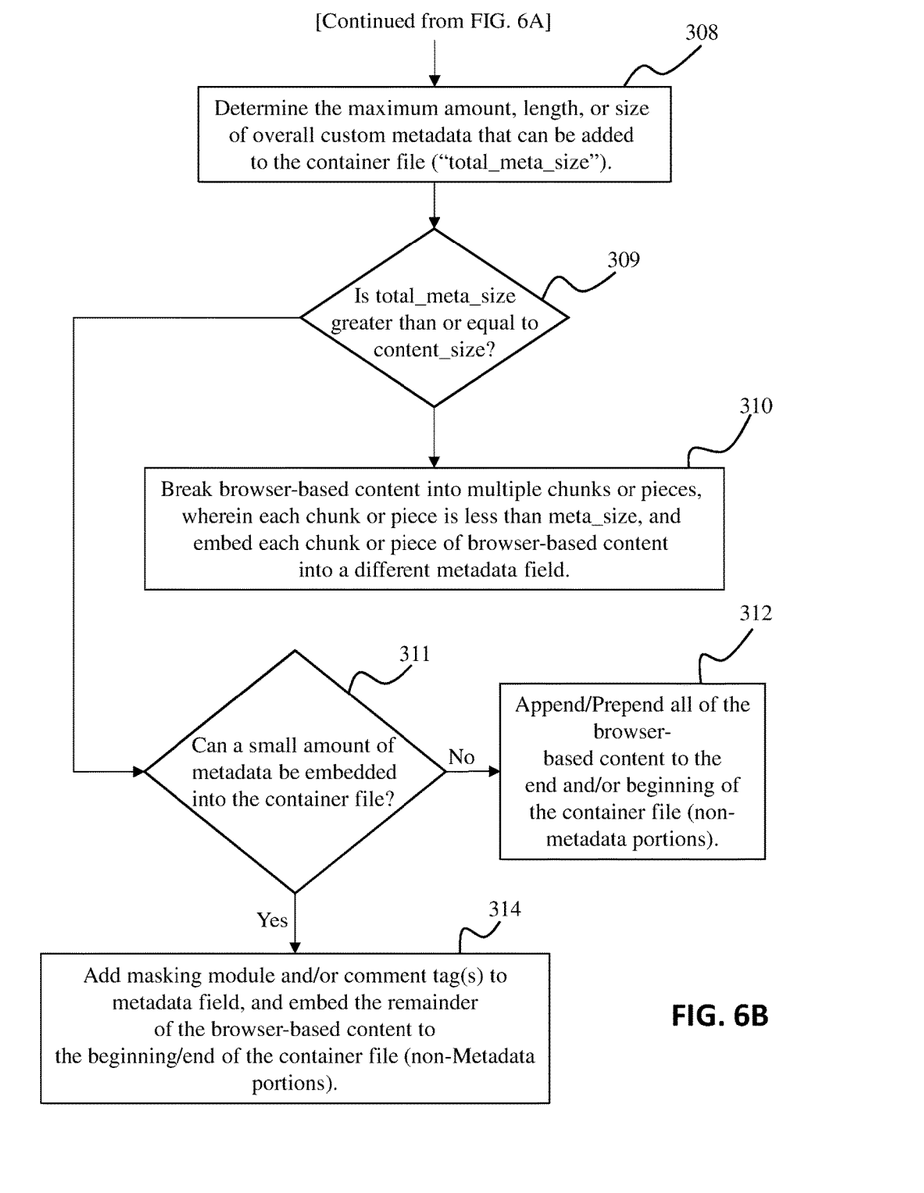

Referring now to FIGS. 6A and 6B, a more detailed method 300 is illustrated wherein the browser-based content 15 (which includes the masking module 22, the main browser-based content 20, and the comment tags 24, 25, 26, 27) can be embedded into a single instance of a metadata field 34 (e.g., Example 1, above), the main browser-based content 20 can be appended to the end of the container file along with a closing HTML comment tag 25, the masking module 22 and an opening HTML comment tag 24 being included in a single instance of a metadata field 34 (e.g., Example 2, above), or the overall browser-based content 15 can be broken into multiple chunks or pieces, embedded into multiple metadata fields, and then applicable parts being reassembled for display/access (e.g., Example 3, above).

In particular, as shown at 302, and similar to 202 in FIG. 5, the method 300 includes or begins by selecting, creating or determining a container file, which as described herein can be virtually any binary-based, text-based, or other computer file that allows for the addition of ancillary data, whether in the form of metadata added accordingly to corresponding metadata fields and/or appended to the end of the file and/or added to the beginning of the file.

Next, as shown at 304, the method 300 includes creating standalone browser-based content 15 (e.g., content that can be read and interpreted by a web browser), which is often in the form of HTML, CSS, and JavaScript, although other languages/methods supported by web browsers is contemplated. As provided herein, the browser-based content 15 (which includes the masking module 22, the main browser-based content 20, and any comment tags 24, 25, 26, 27) can be virtually any application, program, code, module, etc., such as a photo album, slideshow, note-taking application, video or audio application, etc. In any event, once the browser-based content 15 is created, the length or size of the overall browser-based content 15 (which includes the masking module 22, the main browser-based content 20, and comment tags 24, 25, 26, 27) is determined (e.g., in bytes, kilobytes, megabytes, etc.) ("content_size"). The length or size of the browser-based content 15 (along with the type of file chosen as the container file) may determine how and/or where the content is added to the container file to create the composite file.

For instance, with reference to 305, the method 300 of at least one embodiment includes determining whether the container file 30 supports the insertion of custom metadata. For example, some file types, such as JPG, PNG, GIF, TIFF, MP3, WAV, etc. allow for the addition of custom metadata, although the allotted specifications for the metadata fields are different for each. Accordingly, if the container file 30 does support the insertion of custom metadata, then, as shown at 306, the method 300 may include determining the maximum size or length of each instance of metadata that is allowed in that file type ("meta_size"). For example, JPG files are limited to approximately 64 KB per marker segment of custom metadata. Also, unlike JPG files, the metadata specifications for PNG files allow for large amounts of data (e.g., a maximum of 2,147,483,647 bytes) to be placed into a single metadata instance. Other file types may have different maximum size requirements or specifications.

With reference to 307 in FIG. 6A, the method 300 may also include determining whether the maximum size of a single instance of metadata ("meta_size") is large enough to hold the entire amount of browser-based content 15 ("content_size"). If so, then the entire browser-based content 15 can be inserted into a single instance of a metadata field (after first determining that the addition of the custom metadata will not conflict with any overall or cumulative metadata size restrictions, should other qualifying metadata already be present in the file). This is exemplified in Example 1, provided herein.

If, however, the entire browser-based content 15 cannot be added into a single metadata field or instance based on the size constraints ("meta_size"), then as shown at 308, the method 300 of at least one embodiment includes determining the maximum amount or size of overall custom metadata ("total_meta_size") that can be added to the container file. For example, in a JPG file, although each metadata instance is limited in size, there is no theoretical maximum for the total number of allowed metadata instances that can be added (depending on available memory, however). With regard to PNG files, the maximum of 2,147,483,647 bytes is the overall or cumulative size allowed for custom metadata, whether the data is placed into a single metadata field or instance, or placed into multiple separate metadata fields or instances. Furthermore, the maximum amount or size of overall custom metadata ("total_meta_size") is actually calculated by taking the maximum amount or size of overall custom metadata allowed in the file type and then subtracting the total amount/size of any existing custom metadata already existent in the file (i.e., before the browser-based content 15 is added).

As shown at 309 and 310, if the maximum amount of overall metadata ("total_meta_size") is greater than or equal to the total size of the browser-based content 15 to be added, then the browser-based data 15 can be broken into multiple chunks or pieces and be placed into separate metadata fields. This is exemplified in Example 3, provided herein.

For example, if the total size of the desired browser-based content 15 to embed is 153 KB, then using a JPG file as the container file, the 153 KB can be broken into three separate chunks: two 50 KB chunks and one 53 KB chunk. Each of the three chunks can then be inserted into the JPG file as separate COM or APPx marker segments for a total of three added segments.

As shown at 311 and 312, if the maximum length or size of a single instance of metadata ("meta_size") is unable to hold the total amount of browser-based content 15 to be added, and if the browser-based content 15 cannot be added as multiple instances of metadata (e.g., due to overall size limitations ("total_meta_size")), then it can be determined if a small amount of data can be inserted as a single instance of metadata within the file 311. If so, then the masking module 22 and/or comment tags 24, 25, 26, 27 can be inserted into the metadata instance, and the remaining portions of the browser-based content 15 (i.e., the main browser-based content 20) to be added can be appended to the end of the file. This is exemplified in Example 2, provided herein.

Also, if only a minimal string of custom metadata is allowed (e.g., at least four characters), then a simple opening HTML comment tag ("<!- -") can be inserted into the metadata field in order to hide the binary data 35 that follows. Then, the masking module 22, along with the main browser-based content 20, can be appended to the end of the file.

If, however, custom metadata cannot be embedded in the file in any manner, then all of the data (e.g., the masking module 22, the main browser-based content 20, and the comment tags 24, 25, 26, 27 can be appended directly to the beginning and/or end of some qualifying file types, in certain cases, and render in a web browser. For example, when including an opening HTML comment tag 24 at the end of the overall browser-based content 15, appending all of the browser-based content 15 to the beginning of either a PDF or MP3 file will allow the browser-based content 15 to render in a browser, while hiding the binary data of the PDF or MP3 file, when the file is renamed to include an .HTM or .HTML filename extension. This will also allow the PDF or MP3 file to be viewed or played when the file is renamed to the appropriate .PDF or .MP3 extension, due to how these file types are read/loaded.

Also, when all of the browser-based content 15 is appended to the end of certain qualifying file types, such as PDF and MP3 files, the browser-based content may still render in certain circumstances, such as with some smaller files and depending upon the structure of the container file's data.

It should be noted that multiple instances of main browser-based content 20 can be added to binary files 30. For example, a photo gallery (provided in the form of browser-based content consisting of HTML, CSS, and JavaScript code, etc.) can be embedded into a binary type container file, in addition to separate browser-based content consisting of a JavaScript (or other) application (also considered as main browser-based content 20), such as a calculator application, for example. In this case, the embedded browser-based content 15 can include an opening dialogue or request for input providing the user a choice (e.g., by clicking on a button) as to which content to load or view. For instance, click on one button to view the photo gallery and click on another button to load/view the calculator application.

Furthermore, since in at least one embodiment or implementation, all of the browser-based content 15 may be text-based (including instances of Base64-encoded binary data, such as images and audio files), the content can be embedded into metadata fields that do not support binary data.

In addition, it should also be noted that the binary sources of the container file 30 can be accessed from within the viewed content, for instance, via the embedded main browser-based content 20. For example, when renaming the file extension of a composite image file, such as a JPG file or PNG file, to an .HTM or .HTML extension, the main browser-based content 20 can be viewed/accessed and the original image data of the container file 30 can be displayed within the HTML content. This is accomplished by using the renamed file as a data source, as provided in the examples above.

Moreover, another added benefit of certain embodiments of the present invention is that the browser-content 15 can be accessed both locally and via a remote web server. Also, all of the data (which can include multiple images or MP3 files, for example) is self-contained within a single file. In this manner, because the browser-based content 15 can be in the form of CSS, JavaScript, HTML, etc., the browser-based content 15 can also pull data and resources from external databases and other sources, or access content on remote web servers.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention. This written description provides an illustrative explanation and/or account of the present invention. It may be possible to deliver equivalent benefits using variations of the specific embodiments, without departing from the inventive concept. This description and these drawings, therefore, are to be regarded as illustrative and not restrictive.

Now that the invention has been described,
What is claimed is:

1. A method of creating a widely accessible composite data file, the composite data file being operative in a first manner when the composite data file comprises a first filename extension, and the composite data file being operative in a second manner when the composite data file comprises a second filename extension, the method comprising:
selecting a container file associated with the first filename extension, the container file being readily accessible via a common application configured to access computer files associated with the first filename extension, the container file comprising binary data and being adapted to allow ancillary data to be added thereto, wherein the container file remains fully accessible via the common application with the ancillary data added thereto,
creating browser-based content accessible via a web browser,
if the container file supports at least one metadata field, then:
determining the maximum allotted size for each instance of the at least one metadata field, and determining the maximum amount of total metadata allowed for the entire container file,
determining the size of the browser-based content,
embedding at least a portion of the browser-based content into the at least one metadata field of the container file,
otherwise:
adding at least a portion of the browser-based content to non-metadata portions of the container file,
wherein at least a portion of the browser-based content of the composite file is configured to at least partially hide data of the container file from being displayed by the web browser, and wherein selectively renaming the composite data file to comprise the second filename extension allows the composite data file to be accessed by the web browser, such that the portion of the composite data file comprising the container file data is not displayed in the web browser, and wherein selectively renaming the composite data file to comprise the first filename extension allows the composite data file to be accessed by the common application, such that the common application ignores the browser-based content.

2. The method as recited in claim 1 wherein the container file comprises a binary file, and wherein the data from the container file comprises binary data.

3. The method as recited in claim 2 further comprising defining the second filename extension as comprising a web browser-based filename extension.

4. The method as recited in claim 3 wherein the browser-based content comprises at least one comment tag configured to hide at least a portion of the binary data of container file from being displayed by the web browser.

5. The method as recited in claim 3 wherein the composite data file further comprises a masking module configured to hide a portion of the binary data of the container file.

6. The method as recited in claim 5 wherein the masking module is configured to hide opening characters of the container file, and the browser-based content comprises at least one comment tag configured to hide remaining characters of the container file.

* * * * *